(12) United States Patent
Kim (10) Patent No.: US 11,581,616 B2
(45) Date of Patent: Feb. 14, 2023

(54) CYLINDRICAL SECONDARY BATTERY HAVING ADHESION UNIT INCLUDING GAS-GENERATING MATERTIAL

(71) Applicant: LG CHEM, LTD., Seoul (KR)

(72) Inventor: Kyung Min Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 158 days.

(21) Appl. No.: 16/770,867

(22) PCT Filed: Jan. 29, 2019

(86) PCT No.: PCT/KR2019/001209
§ 371 (c)(1),
(2) Date: Jun. 8, 2020

(87) PCT Pub. No.: WO2019/235714
PCT Pub. Date: Dec. 12, 2019

(65) Prior Publication Data
US 2021/0167474 A1    Jun. 3, 2021

(30) Foreign Application Priority Data

Jun. 4, 2018    (KR) .......................... 10-2018-0064172

(51) Int. Cl.
*H01M 50/578*    (2021.01)
*H01M 50/152*    (2021.01)
(Continued)

(52) U.S. Cl.
CPC ..... *H01M 50/578* (2021.01); *H01M 10/0422* (2013.01); *H01M 10/0431* (2013.01);
(Continued)

(58) Field of Classification Search
CPC ........... H01M 50/578; H01M 2200/20; H01M 50/572; H01M 10/0587; H01M 50/574;
(Continued)

(56) References Cited

U.S. PATENT DOCUMENTS 5,238,757 A * 8/1993 Suzuki ................. H01M 10/28
429/94
6,548,204 B1    4/2003 Kim et al.
(Continued)

FOREIGN PATENT DOCUMENTS

CN    108091784 A    5/2018
EP    2 475 026 A1    7/2012
(Continued)

OTHER PUBLICATIONS

Cheon (KR 20030044512 A) machine translation with paragraph numbers added, corresponds to foreign reference in within Jun. 8, 2020 IDS (Year: 2003).*
(Continued)

*Primary Examiner* — Matthew T Martin
*Assistant Examiner* — Jessie L. Walls
(74) *Attorney, Agent, or Firm* — Birch, Stewart, Kolasch & Birch, LLP (57) ABSTRACT

A cylindrical secondary battery configured to have a structure to which an adhesion unit, including an adhesive material, a conductive material, and a gas-generating material, is provided. The adhesion unit is configured to couple a cap assembly, which functions as a positive electrode terminal of the cylindrical secondary battery, and a positive electrode tab of a jelly-roll type electrode assembly to each other.

10 Claims, 7 Drawing Sheets

(51) Int. Cl.
  *H01M 50/30* (2021.01)
  *H01M 50/536* (2021.01)
  *H01M 50/147* (2021.01)
  *H01M 10/04* (2006.01)
  *H01M 50/574* (2021.01)
  *H01M 50/572* (2021.01)
  *H01M 10/0587* (2010.01)

(52) U.S. Cl.
  CPC ..... *H01M 10/0587* (2013.01); *H01M 50/147* (2021.01); *H01M 50/152* (2021.01); *H01M 50/394* (2021.01); *H01M 50/536* (2021.01); *H01M 50/572* (2021.01); *H01M 50/574* (2021.01); *H01M 2200/00* (2013.01); *H01M 2200/20* (2013.01)

(58) Field of Classification Search
  CPC ......... H01M 2200/00; H01M 10/0422; H01M 10/0431; H01M 50/147; H01M 50/152; H01M 50/394; H01M 2200/10; H01M 50/536; H01M 50/533; H01M 50/3425; H01M 50/538; Y02P 70/50; Y02E 60/10
  See application file for complete search history.

(56) References Cited

U.S. PATENT DOCUMENTS

| | | | | |
|---|---|---|---|---|
| 6,730,430 | B2* | 5/2004 | Chang | H01M 50/3425 429/53 |
| 2009/0061310 | A1* | 3/2009 | Kim | H01M 50/3425 429/185 |
| 2010/0243345 | A1* | 9/2010 | Yebka | H01M 50/3425 713/300 |
| 2010/0330402 | A1 | 12/2010 | Wang et al. | |
| 2012/0052344 | A1 | 3/2012 | Nagai et al. | |
| 2013/0196182 | A1 | 8/2013 | Tanaka et al. | |
| 2017/0194619 | A1 | 7/2017 | Kim | |
| 2017/0294641 | A1 | 10/2017 | Lee et al. | |
| 2020/0212416 | A1 | 7/2020 | Kim et al. | |

FOREIGN PATENT DOCUMENTS

| | | |
|---|---|---|
| JP | 2000-77061 A | 3/2000 |
| JP | 2008-53652 A | 3/2008 |
| JP | 2010-171020 A | 8/2010 |
| JP | 2012-54098 A | 3/2012 |
| JP | 2016-81681 A | 5/2016 |
| JP | 2017-529659 A | 10/2017 |
| JP | 2020-522101 A | 7/2020 |
| KR | 2001-0054738 A | 7/2001 |
| KR | 2003-0044512 A | 6/2003 |
| KR | 10-2006-0037838 A | 5/2006 |
| KR | 10-2011-0029016 A | 3/2011 |
| KR | 10-2011-0039934 A | 4/2011 |
| KR | 10-2012-0103394 A | 9/2012 |
| KR | 10-2017-0081449 A | 7/2017 |
| KR | 10-2017-0109070 A | 9/2017 |
| WO | WO 2012/002523 A1 | 1/2012 |
| WO | WO 2017/195480 A1 | 11/2017 |

OTHER PUBLICATIONS

Noriyuki (JP 2016081681 A) machine translation with paragraph numbers added, corresponds to foreign reference in within May 21, 2021 IDS (Year: 2016).*
International Search Report for PCT/KR2019/001209 (PCT/ISA/210) dated May 15, 2019.
Extended European Search Report for European Application No. 19814357.0, dated Mar. 11, 2021.

* cited by examiner

CYLINDRICAL SECONDARY BATTERY HAVING ADHESION UNIT INCLUDING GAS-GENERATING MATERTIAL

TECHNICAL FIELD

This application claims the benefit of priority to Korean Patent Application No. 2018-0064172 filed on Jun. 4, 2018, the disclosure of which is hereby incorporated by reference herein its entirety.

The present invention relates to a cylindrical secondary battery having an adhesion unit including a gas-generating material, and more particularly to a cylindrical secondary battery configured to have a structure in which a positive electrode tab of a jelly-roll type electrode assembly is coupled to a cap assembly via an adhesion unit including an adhesive material, a conductive material, and a gas-generating material.

BACKGROUND ART

Secondary batteries, which can be charged and discharged and which can be repeatedly used, have been used as energy sources for a portable electronic device, a power tool, an electric vehicle, a power storage system, etc., and the demand for high-output and high-capacity secondary batteries has increased.

Based on the shape of a battery case, the secondary batteries are classified into a cylindrical secondary battery having an electrode assembly mounted in a cylindrical metal can, a prismatic secondary battery having an electrode assembly mounted in a prismatic metal can, and a pouch-shaped secondary battery having an electrode assembly mounted in a pouch-shaped case made of an aluminum laminate sheet.

The electrode assembly, which is mounted in the battery case, is a power generating element that is configured to have a structure in which a positive electrode, a separator, and a negative electrode are stacked and that can be charged and discharged. The electrode assembly is classified as a jelly-roll type electrode assembly, which is configured to have a structure in which a sheet type positive electrode and a sheet type negative electrode, to which active materials are applied, are wound in the state in which a separator is disposed between the positive electrode and the negative electrode, or a stacked type electrode assembly, which is configured to have a structure in which a plurality of positive electrodes having a predetermined size and a plurality of negative electrodes having a predetermined size are sequentially stacked in the state in which separators are disposed respectively between the positive electrodes and the negative electrodes. The jelly-roll type electrode assembly has advantages in that it is easy to manufacture the jelly-roll type electrode assembly and in that the jelly-roll type electrode assembly has high energy density per unit weight. For these reasons, the jelly-roll type electrode assembly has been widely manufactured. The jelly-roll type electrode assembly is usually applied to a cylindrical battery.

Generally, in a cylindrical secondary battery, a positive electrode tab of a jelly-roll type electrode assembly is coupled to a cap assembly such that a top cap functions as a positive electrode terminal. The positive electrode tab and the cap assembly are coupled to each other by welding, for example, laser welding.

In the welding process, however, residual foreign matter may be generated, whereby the external appearance of the electrode assembly may be damaged, or the top cap may be distorted.

Therefore, there is a necessity for technology that is capable of solving problems occurring while the positive electrode terminal of the cylindrical secondary battery is formed and of preventing the overcharge of the secondary battery.

In connection therewith, Patent Document 1 discloses a structure in which a plurality of first electrode tabs is disposed under a sub plate and a middle plate so as to be joined both to the sub plate and to the middle plate, wherein internal resistance decreases as the tightness of contact of the junction structure is increased, whereby the possibility of poor welding is reduced.

That is, Patent Document 1 discloses a structure that is capable of reducing the internal resistance of a secondary battery but does not suggest any coupling method other than a welding method, which may generate foreign matter.

Patent Document 2 discloses a structure in which a terminal plate is attached to the upper surface of a conductive adhesive, a negative electrode terminal is electrically connected through a hollow portion formed in the terminal plate, and a negative electrode tab is attached to the lower surface of the conductive adhesive. However, a secondary battery disclosed in Patent Document 2 is configured to have a structure in which the conductive adhesive melts or is deformed, and therefore the connected portions of the negative electrode tab and the negative electrode terminal are separated from each other such that the negative electrode tab and the negative electrode terminal are spaced apart from each other, whereby the electrical connection therebetween is released.

Patent Document 3 discloses a cap assembly configured to have a structure in which the outer circumferential surface of a stack including a top cap and a safety vent, which are sequentially stacked, is wrapped with a main gasket and in which a current interrupt device, at which the outer circumferential surface of the stack is wrapped with an auxiliary gasket, is joined to the lower side of the safety vent, wherein the drooping of the main gasket is prevented by the auxiliary gasket.

Patent Document 4 discloses a structure in which, at the innermost side of an electrode formed by winding a positive electrode, a negative electrode, and a porous separator, a wire is wound at least 1.5 turns around a base plate of one of the positive electrode and the negative electrode to form an electrode core, an electrode tab is attached to a region between the winding start part and the 1.5-turn part of the base plate, and the end of the electrode tab is connected to a cap assembly.

However, Patent Document 3 and Patent Document 4 do not suggest a plan that is capable of solving the problems that occur in the process of connecting the electrode terminal and the electrode tab to each other.

Therefore, there is a high necessity for technology that is capable of easily forming a connection structure between a positive electrode tab of a jelly-roll type electrode assembly and a cap assembly in a cylindrical secondary battery, of releasing electrical connection within a short time, and of preventing the occurrence of problems caused by foreign matter, which may occur during welding, etc.

PRIOR ART DOCUMENT (Patent Document 1) Korean Patent Application Publication No. 2017-0081449

(Patent Document 2) Korean Patent Application Publication No. 2003-0044512
(Patent Document 3) Korean Patent Application Publication No. 2011-0039934
(Patent Document 4) Korean Patent Application Publication No. 2001-0054738

DISCLOSURE

Technical Problem

The present invention has been made in view of the above problems, and it is an object of the present invention to provide a cylindrical secondary battery configured such that it is possible to prevent foreign matter from being generated in the process of electrically connecting an electrode tab and a cap assembly to each other or to prevent the cap assembly from shaking in the above process.

Technical Solution

In accordance with the present invention, the above and other objects can be accomplished by the provision of a cylindrical secondary battery including a jelly-roll type electrode assembly configured to have a structure in which a sheet type positive electrode and a sheet type negative electrode are wound in the state in which a separator is disposed between the positive electrode and the negative electrode, the jelly-roll type electrode assembly including a positive electrode tab, a cylindrical battery case configured to receive the jelly-roll type electrode assembly, the cylindrical battery case having an open upper end, a cap assembly mounted to the open upper end of the cylindrical battery case, and an adhesion unit connecting a lower end surface of the cap assembly to the positive electrode tab of the jelly-roll type electrode assembly, the adhesion unit including an adhesive material, a conductive material, and a gas-generating material.

The adhesive material may include at least one selected from the group consisting of a polyester resin, an epoxy resin, a phenol resin, polyvinyl acetate, polyvinyl butyral, and polyester acrylate.

The conductive material may include at least one selected from the group consisting of graphite, carbon black, conductive fiber, gold, silver, copper, aluminum, and an alloy of gold, silver, copper, and aluminum.

The gas-generating material may be lithium carbonate ($Li_2CO_3$), $CaCO_3$, $K_2CO_3$, $Na_2CO_3$, or $BaCO_3$.

The content of the gas-generating material may be greater than 20 wt % to 100 wt % of the content of the conductive material.

The cylindrical secondary battery may be configured such that a reaction of the gas-generating material may commence when the voltage of the cylindrical secondary battery increases, whereby the adhesion unit may swell, particles of the conductive material may become spaced apart from each other, and the flow of current may be interrupted.

The temperature at which the reaction of the gas-generating material commences may be lower than the melting temperature of the adhesive material.

The cylindrical secondary batter may be configured such that, when a voltage of the cylindrical secondary battery increases, a coupling force of the adhesion unit may be reduced due to melting of the adhesive material, whereby the positive electrode tab may be separated from the cap assembly.

The cap assembly may be configured to have a structure which may include a venting member, and the cap assembly may be configured to have a structure from which a PTC element is omitted.

The cylindrical secondary battery may be configured such that, when coupling of the adhesion unit is weakened due to the reaction of the gas-generating material, a shape of the venting member of the cap assembly may be inverted, whereby the venting member may be separated from the positive electrode tab.

The cap assembly may be configured to have a structure which includes a venting member, and the cap assembly may be configured to have a structure in which a PTC element and a current interrupt device are omitted.

BEST MODE

A cylindrical secondary battery according to the present invention may include a jelly-roll type electrode assembly configured to have a structure in which a sheet type positive electrode and a sheet type negative electrode are wound in the state in which a separator is disposed between the positive electrode and the negative electrode, a cylindrical battery case configured to receive the jelly-roll type electrode assembly, and a cap assembly mounted to the open upper end of the cylindrical battery case, wherein the lower end surface of the cap assembly may be connected to a positive electrode tab of the jelly-roll type electrode assembly via an adhesion unit, and the adhesion unit may include an adhesive material, a conductive material, and a gas-generating material.

That is, in the present invention, the adhesion unit is used in order to couple the lower end surface of the cap assembly and the positive electrode tab of the jelly-roll type electrode assembly to each other, and the adhesion unit includes an adhesive material, a conductive material, and a gas-generating material.

Specifically, the adhesion unit of the present invention may include an adhesive material configured to increase the force of coupling between the positive electrode tab and the cap assembly while maintaining the shape of the adhesion unit in a normal state, a conductive material configured to serve as an electrical connection path between the positive electrode tab and the cap assembly, and a gas-generating material configured to commence a reaction when the temperature of the secondary battery increases in order to discharge gas.

As described above, in the cylindrical secondary battery according to the present invention, the adhesion unit, which includes the adhesive material, is added to the lower surface of the cap assembly, to which the positive electrode tab is coupled, without using a conventionally used welding method, such as laser welding, in order to achieve electrical connection between the positive electrode tab and the cap assembly, which functions as a positive electrode terminal.

Consequently, it is possible to prevent the occurrence of a problem in which foreign matter is separated from the electrode assembly as the result of using laser welding for the cylindrical secondary battery, as in the conventional art, whereby the separator is damaged or reacts with an electrolytic solution.

The adhesive material is not particularly restricted, as long as the adhesive material is made of a material that is capable of increasing the force of coupling between the positive electrode tab and the cap assembly. For example, the adhesive material may be made of at least one selected from the group consisting of a polyester resin, an epoxy resin, a phenol resin, polyvinyl acetate, polyvinyl butyral, and polyester acrylate.

The conductive material serves as an electrical connection path between the positive electrode tab and the cap assembly. The conductive material is not particularly restricted, as long as the conductive material is made of a material that exhibits high electrical conductivity. For example, the conductive material may be made of at least one selected from the group consisting of graphite, carbon black, conductive fiber, such as carbon fiber or metal fiber, gold, silver, copper, aluminum, and an alloy of gold, silver, copper, and aluminum.

The gas-generating material is not particularly restricted, as long as the gas-generating material is a material that initiates a reaction to discharge gas when the voltage of the battery increases. For example, the gas-generating material may be lithium carbonate ($Li_2CO_3$), $CaCO_3$, $K_2CO_3$, $Na_2CO_3$, or $BaCO_3$.

The content of the gas-generating material may be greater than 20 wt % to 100 wt % of the content of the conductive material.

In the case in which the content of the gas-generating material is less than 20 wt % of the content of the conductive material, a small amount of gas is generated, whereby it is difficult to obtain a desired voltage increase effect, which is undesirable. In addition, in the case in which the content of the gas-generating material is greater than the content of the conductive material, the electrical conductivity of the positive electrode terminal becomes an issue, which is also undesirable.

In a concrete example, the cylindrical secondary battery according to the present invention is configured to have a structure in which the adhesion unit, including the gas-generating material, is added. The reaction of the gas-generating material commences when the voltage of the cylindrical secondary battery increases, whereby gas is generated in the adhesion unit. As the gas is generated, as described above, the adhesion unit swells, and gaps between particles of the conductive material, which are arranged in tight contact in a normal state, are filled with gas bubbles, whereby the particles of the conductive material are spaced apart from each other.

As a result, resistance increases, and voltage increases in proportion to the increase in the resistance. Subsequently, the voltage reaches a charge end voltage, and the flow of current is interrupted. That is, unlike the conventional art, in which venting is performed due to an increase in the internal pressure of the battery in the state in which the positive electrode tab is connected to the cap assembly by welding, whereby the positive electrode tab and the cap assembly are physically separated from each other, the adhesion unit, including the gas-generating material, may swell, whereby the particles of the conductive material may become spaced apart from each other and thus the flow of current may be interrupted according to the present invention.

For example, in the case in which lithium carbonate is used as the gas-generating material, the lithium carbonate is decomposed into carbon monoxide and carbon dioxide when the voltage of the battery reaches 4.8V, whereby gas is formed. As a result, gaps are formed between the particles of the conductive material of the adhesion unit, which are arranged in tight contact, whereby the particles of the conductive material may become spaced apart from each other.

The temperature at which the reaction of the gas-generating material commences may be lower than the melting temperature of the adhesive material. In a specific temperature range, therefore, the adhesive material may not melt, but the reaction of the gas-generating material may commence, thus generating gas. In this state, the physical coupling between the positive electrode tab and the cap assembly is maintained, but the distance between the particles of the conductive material is increased due to the generation of gas, whereby resistance increases. However, when the temperature further increases, whereby the amount of gas that is generated in the gas-generating material increases, and, in addition, the adhesive material melts, whereby the adhesiveness of the adhesive material is reduced, the physical coupling between the positive electrode tab and the cap assembly may be released.

That is, when the voltage of the cylindrical secondary battery increases, resistance may increase due to the generation of gas in the adhesion unit, whereby the voltage may increase to a charge end voltage and thus the flow of current may be interrupted. In consideration of the fact that the general temperature of the battery is about 60° C. or lower when the voltage of the battery reaches the charge end voltage, the adhesive material of the adhesion unit may not melt.

However, in the case in which the temperature of the battery instantaneously increases due to external impact, etc. before the voltage of the battery reaches the charge end voltage, the coupling force of the adhesion unit may be reduced due to melting of the adhesive material, whereby the positive electrode tab may be separated from the cap assembly.

Compared to the conventional case, in which the positive electrode tab is coupled to the cap assembly by welding, therefore, the coupling force of the adhesion unit is relatively low. Consequently, the force necessary to separate the positive electrode tab and the cap assembly from each other is relatively reduced, whereby rapid separation therebetween may be achieved.

In a concrete example, the cap assembly may be configured to have a structure which includes a venting member and from which a PTC element is omitted, the venting member or a current interrupt device may be located at the lower end of the cap assembly, and the jelly-roll type electrode assembly may extend so as to have an additional length corresponding to the thickness of the PTC element, which is omitted.

In the cylindrical secondary battery having the above structure, the jelly-roll type electrode assembly may become relatively long, compared to a conventional cylindrical secondary battery having the same standards, whereby it is possible to provide a high-capacity cylindrical secondary battery.

In addition, the cylindrical secondary battery according to the present invention includes an adhesion unit including a gas-generating material, which generates gas when the voltage of the battery increases. An increase in resistance may be induced due to the gas-generating material, whereby the flow of current may be interrupted. Consequently, it is possible to obtain the same effect even in the case in which the PTC element, which is included in the conventional cylindrical secondary battery, is omitted.

Meanwhile, the venting member may be configured to have a downwardly concave structure. In the case in which coupling of the adhesion unit is weakened due to the reaction of the gas-generating material, the shape of the venting member is inverted, whereby the venting member is separated from the positive electrode tab. Consequently, the positive electrode tab and the cap assembly may be physically separated from each other.

In another concrete example, in consideration of the fact that the cylindrical secondary battery according to the present invention is configured to have a structure in which the adhesion unit swells due to the gas-generating material, whereby resistance increases and thus the flow of current is interrupted, the cap assembly may be configured to have a structure which includes a venting member and from which a PTC element and a current interrupt device are omitted, the venting member may be located at the lower end of the cap assembly, and the jelly-roll type electrode assembly may extend so as to have an additional length corresponding to the thicknesses of the PTC element and the current interrupt device, which are omitted.

That is, in the case in which the structure from which the PTC element and the current interrupt device are omitted is included, as described above, the thickness of the cap assembly is relatively reduced, whereby it is possible to increase the height of the jelly-roll type electrode assembly by a length corresponding to the reduced thickness of the cap assembly and thus it is possible to obtain an effect in which the capacity of the battery is increased.

In addition, in the cylindrical secondary battery having the above structure, the current interrupt device is further omitted, compared to a cylindrical secondary battery configured to have a structure which includes the venting member and from which the PTC element is omitted, whereby the thickness of the cap assembly may be reduced by the thickness of the omitted current interrupt device.

Compared to a cylindrical secondary battery having the same standards, the jelly-roll type electrode assembly may become relatively long, whereby it is possible to provide a high-capacity cylindrical secondary battery.

In the cylindrical secondary battery configured to have a structure from which the PTC element and the current interrupt device are omitted, as described above, the venting member is located under the top cap, and the adhesion unit is added to the lower surface of the venting member, whereby electrical connection with the positive electrode tab may be achieved.

Hereinafter, preferred embodiments of the present invention will be described in detail with reference to the accompanying drawings such that the preferred embodiments of the present invention can be easily implemented by those skilled in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the another part, but also, the one part may be indirectly connected to the another part via a further part. In addition, that a certain element is included does not mean that other elements are excluded, but means that such elements may be further included unless mentioned otherwise.

Embodiments of the present invention will be described in detail with reference to the accompanying drawings.

Figure 1:
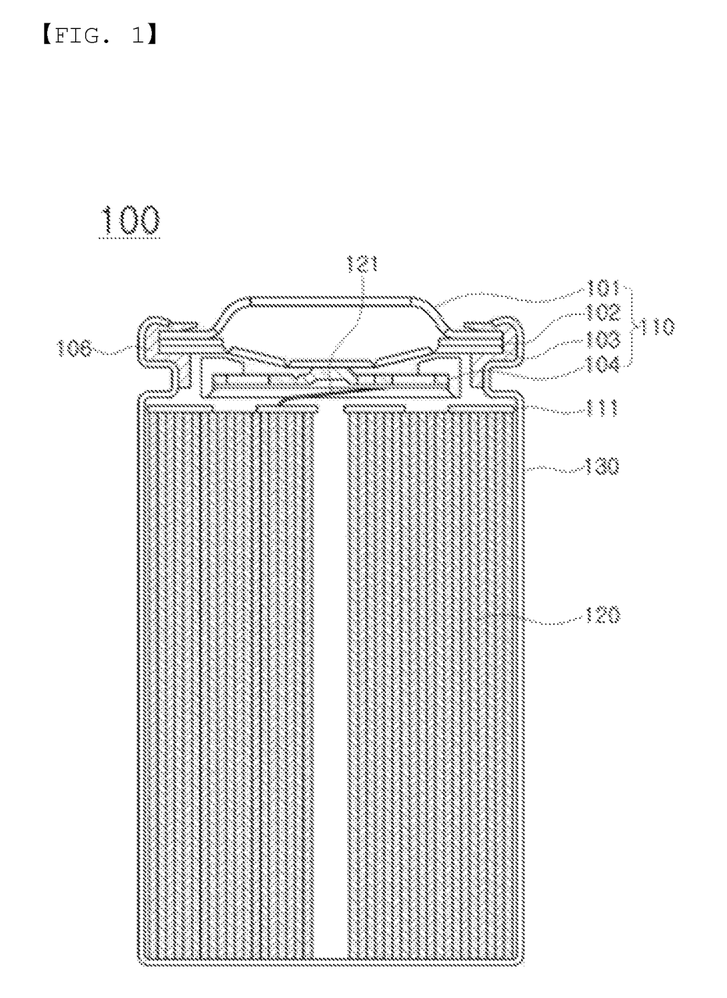
FIG. 1 is a vertical sectional view showing a conventional general cylindrical secondary battery.

FIG. 1 is a vertical sectional view showing a conventional general cylindrical secondary battery.

Referring to FIG. 1, the cylindrical secondary battery 100 includes a battery case 130, in which a jelly-roll type electrode assembly 120 is received, and a cap assembly 110 located at the upper part of the battery case 130. A top cap 101 is located at the upper end of the cap assembly 110, and a PTC element 102, configured to interrupt the flow of current at high temperature, a venting member 103, configured to discharge high-pressure gas, and a current interrupt device 104, configured to interrupt the flow of current when the inner pressure of the battery increases, are sequentially stacked under the top cap 101.

At the region of contact between the cap assembly 110 and the battery case 130 is disposed a gasket 106 configured to secure the sealing force of the secondary battery, and a positive electrode tab 121 of the jelly-roll type electrode assembly is coupled to the lower surface of the current interrupt device 104 by welding.

Above the jelly-roll type electrode assembly 120 may be located an insulation member 111 configured to prevent contact between the positive electrode tab 121 and the battery case 130.

Figure 2:
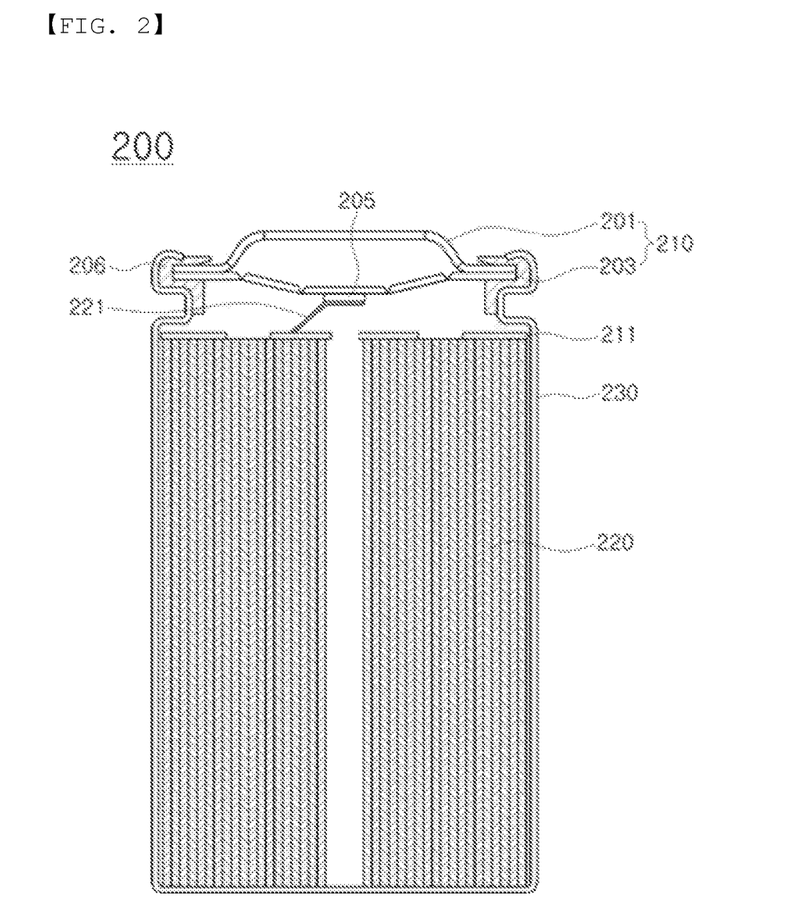
FIG. 2 is a vertical sectional view showing a cylindrical secondary battery according to an embodiment of the present invention.
Figure 3:
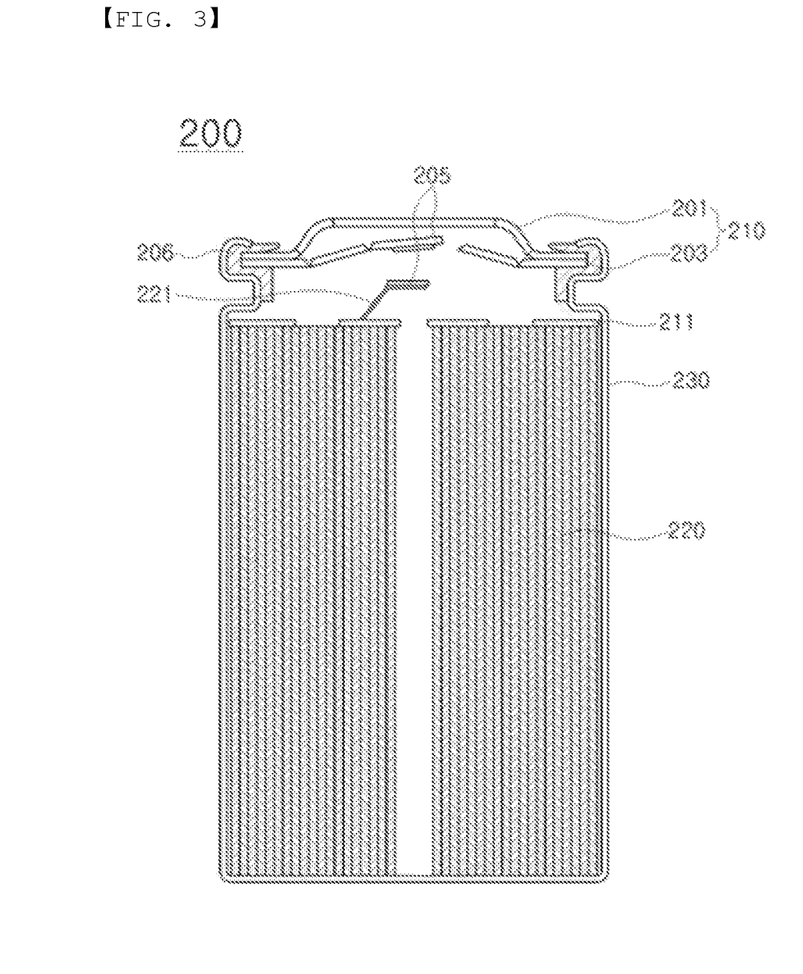
FIG. 3 is a vertical sectional view showing the state in which the flow of current is interrupted in the cylindrical secondary battery of FIG. 2.

FIG. 2 is a vertical sectional view showing a cylindrical secondary battery according to an embodiment of the present invention, and FIG. 3 is a vertical sectional view showing the state in which a venting member of FIG. 2 ruptures.

Referring to FIG. 2, the cylindrical secondary battery 200 includes a battery case 230, in which a jelly-roll type electrode assembly 220 is received, and a cap assembly 210 located at the upper part of the battery case 230. A top cap 201 is located at the upper end of the cap assembly 210, and a venting member 203 is located under the top cap 201.

That is, the cap assembly 210 of the cylindrical secondary battery 200 is configured to have a structure in which the PTC element 102 and the current interrupt device 104 are omitted from the structure of the cylindrical secondary battery 100, the top cap 201 and the venting member 203 are included, and a gasket 206 configured to secure sealing force is disposed at the region of contact between the cap assembly 210 and the battery case 230.

A positive electrode tab 221 of the jelly-roll type electrode assembly 220 is coupled to the lower surface of the venting member 203 via an adhesion unit 205.

Meanwhile, unlike what is shown in FIG. 2, the cylindrical secondary battery 200 may be configured to have a structure in which a current interrupt device is further added to the lower surface of the venting member 203, and the positive electrode tab of the electrode assembly may be coupled to the current interrupt device so as to be electrically connected to the top cap via the venting member.

FIG. 3 is a vertical sectional view showing the state in which the flow of current is interrupted in the cylindrical secondary battery of FIG. 2.

Referring to FIG. 3, there is shown the state in which, when the pressure in the battery case increases due to repeated charge and discharge of the cylindrical secondary battery, the venting member 203, which does not withstand the pressure, is inverted to an upwardly concave structure, whereby a notch portion of the venting member, which is relatively thin, ruptures.

The adhesion unit 205 includes a gas-generating material. In the case in which the pressure in the battery increases, therefore, gas is generated, whereby the adhesion unit swells and thus the coupling force of the adhesion unit is reduced. Consequently, the adhesion unit 205, which is added to the lower surface of the venting member 203 in order to maintain coupling between the venting member and the positive electrode tab 221, is divided into two parts. As a result, a portion of the adhesion unit is attached to the lower surface of the venting member 203, and the remaining portion of the adhesion unit is attached to the positive electrode tab 221.

Figure 4:
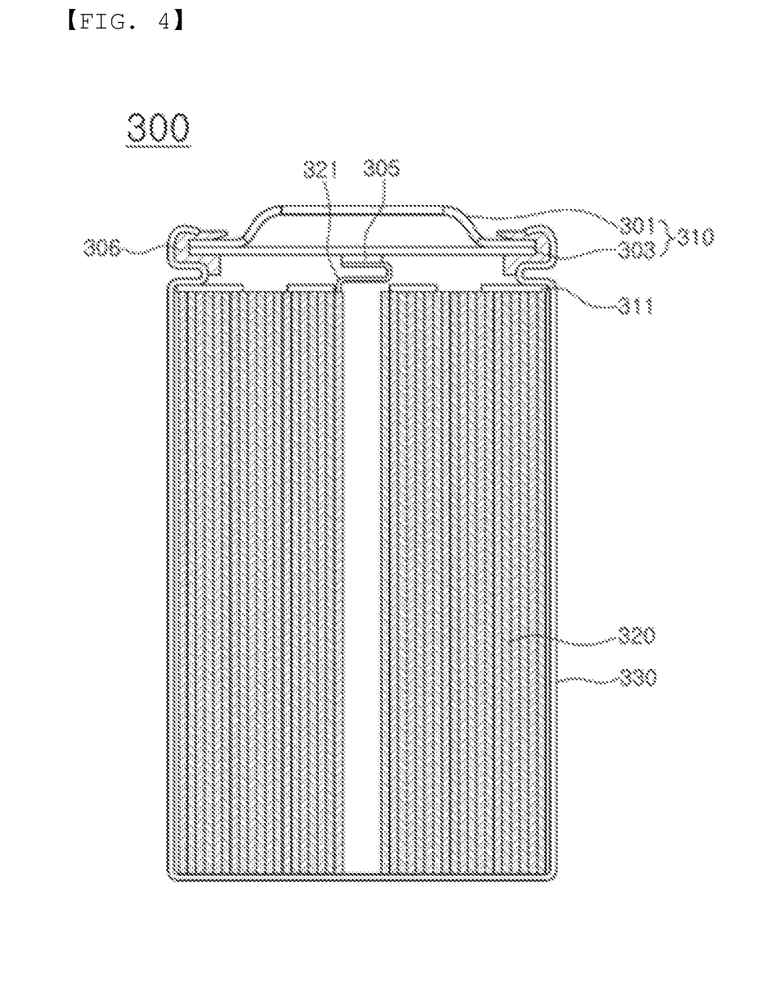
FIG. 4 is a vertical sectional view showing a cylindrical secondary battery according to another embodiment of the present invention.

FIG. 4 is a vertical sectional view showing a cylindrical secondary battery according to another embodiment of the present invention.

Referring to FIG. 4, the cylindrical secondary battery 300 includes a battery case 330, in which a jelly-roll type electrode assembly 320 is received, a cap assembly 310, and a gasket 306 disposed between the cap assembly 310 and the battery case 330, the gasket 306 being configured to secure force for sealing the battery case.

A top cap 301 is located at the upper part of the cap assembly 310, and a venting member 303 is located under the top cap 301. That is, the cap assembly 310 of the cylindrical secondary battery 300 is configured to have a structure in which the PTC element 102 and the current interrupt device 104 are omitted from the structure of the cylindrical secondary battery 100.

A positive electrode tab 321 of the jelly-roll type electrode assembly 320 is coupled to the lower surface of the venting member 303 via an adhesion unit 305, and the venting member 303 is connected to the top cap 301, whereby the top cap may function as a positive electrode terminal.

Above the jelly-roll type electrode assembly 320 may be located an insulation member 311 configured to prevent contact between the positive electrode tab 321 and the battery case 330.

In the present invention, voltage increases due to the gas generated in the adhesion unit, whereby the flow of current is interrupted. That is, the flow of current is interrupted before the venting member ruptures due to an increase in the internal pressure of the battery. Consequently, a venting member 203 having a downwardly concave structure, such as the venting member 230 of FIG. 2, may not be used.

As needed, however, a venting member 203 formed in a downwardly concave shape, such as the venting member 203 of FIG. 2, may be used.

Figure 5:
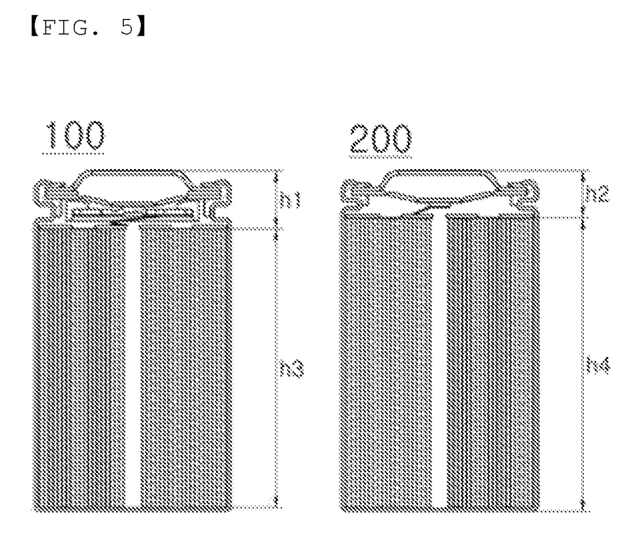
FIG. 5 is a vertical sectional view showing a comparison of the heights of electrode assemblies included in the cylindrical secondary batteries of FIGS. 1 and 2.

FIG. 5 is a vertical sectional view showing a comparison of the heights of the electrode assemblies included in the cylindrical secondary batteries of FIGS. 1 and 2.

Referring to FIG. 5, the cylindrical secondary battery 200 is configured to have a structure in which the PTC element 102 and the current interrupt device 104 are omitted from the cylindrical secondary battery 100.

Consequently, the thickness h2 of the cap assembly of the cylindrical secondary battery 200 is less than the thickness h1 of the cap assembly of the cylindrical secondary battery 100.

In the case in which the thickness of the cap assembly is reduced, as described above, the height h4 of the electrode assembly of the cylindrical secondary battery 200 becomes greater than the height h3 of the electrode assembly of the cylindrical secondary battery 100, on the assumption that the overall heights of the cylindrical secondary batteries are equal to each other. Consequently, the cylindrical secondary battery 200 may be a higher-capacity secondary battery than the cylindrical secondary battery 100.

Figure 6:
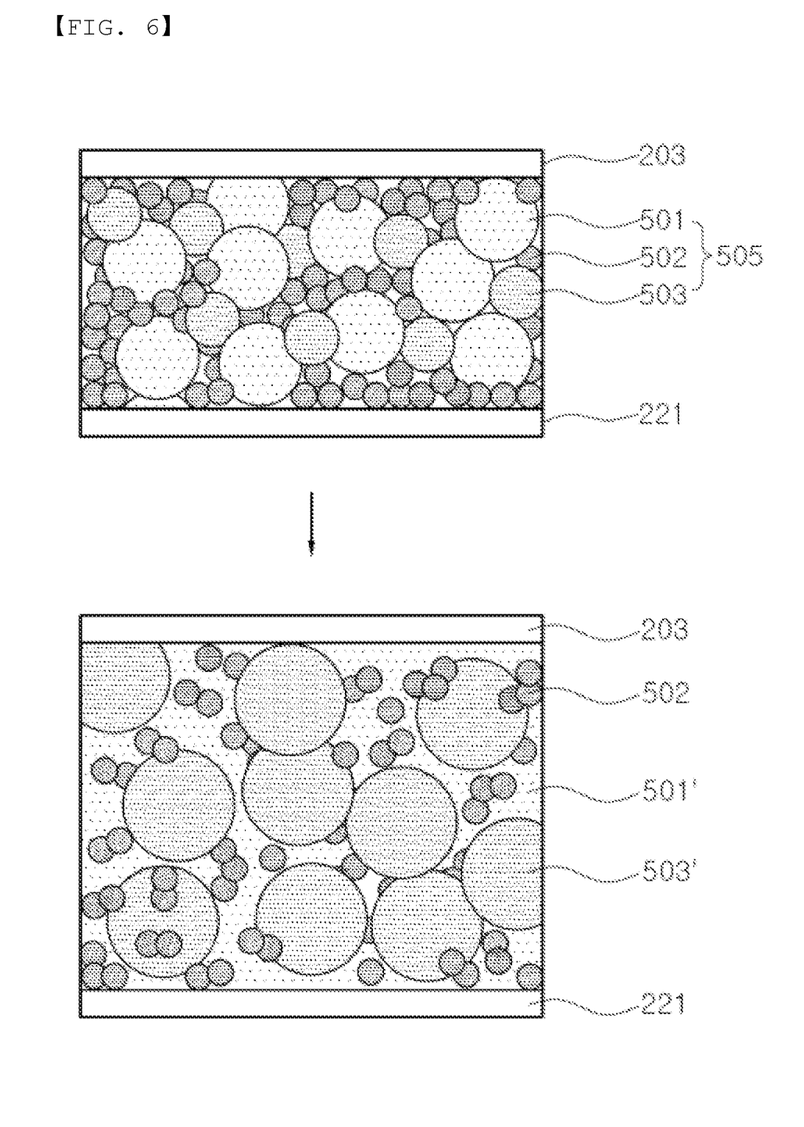
FIG. 6 is an enlarged view showing the states before and after an adhesion unit of FIG. 2 is deformed.

FIG. 6 is an enlarged view showing the states before and after the adhesion unit shown in FIG. 2 is deformed.

Referring to FIG. 6, the upper surface of an adhesion unit is coupled to the venting member 203, and the lower surface of the adhesion unit is coupled to the positive electrode tab 221.

The adhesion unit 505 includes an adhesive material 501, a conductive material 502, and a gas-generating material 503.

In a normal state, coupling between the venting member 203 and the positive electrode tab 221 via the adhesion unit 505 is achieved, whereby electrical connection through the conductive material 502, particles of which are arranged in tight contact, is achieved. When the gas-generating material 503 commences a reaction due to an increase in the voltage of the battery, however, the volume of the adhesion unit 505 expands, whereby the distance between the particles of the conductive material 502 increases. As a result, a resistance increase effect is generated, and the increase of voltage is accelerated. Subsequently, when the voltage of the secondary battery increases to a charge end voltage, the flow of current is interrupted. In this case, the flow of current may be interrupted even though no rupture occurs.

Alternatively, the amount of gas may increase (503') (the gas-generating material being shown in an expanded state) as the result of reaction of the gas-generating material 503, and the coupling force of the adhesion unit 505 may be reduced due to the molten adhesive material 501', whereby the physical coupling between the positive electrode tab and the cap assembly may be released.

Hereinafter, the present invention will be described with reference to the following examples. These examples are provided only for easier understanding of the present invention and should not be construed as limiting the scope of the present invention.

Example 1

Based on the total weight of an adhesion unit, 40 wt % of an epoxy resin, as an adhesive material, 30 wt % of silver, as a conductive material, and 30 wt % of lithium carbonate ($Li_2CO_3$), as a gas-generating material, were mixed with NMP, and the same was dried to manufacture a paste-phase adhesion unit.

The adhesion unit thus manufactured was added to a positive electrode tab of a cylindrical secondary battery, configured to have the structure shown in FIG. 4, and to the lower end of a cap assembly of the cylindrical secondary battery to achieve electrical connection between the positive electrode tab and a current interrupt device. For experimental accuracy, five secondary batteries were manufactured under the same conditions.

Example 2

A paste-phase adhesion unit was manufactured in the same manner as in Example 1, except that 40 wt % of silver, as a conductive material, and 20 wt % of lithium carbonate were used, unlike Example 1, and then five cylindrical secondary batteries each having the adhesion unit added thereto were manufactured.

Comparative Example 1

A cylindrical secondary battery configured to have the structure shown in FIG. 1 was prepared, and five cylindrical secondary batteries, each configured to have a structure in which a positive electrode tab and a cap assembly were coupled to each other by welding, were manufactured.

Comparative Example 2

A paste-phase adhesion unit was manufactured in the same manner as in Example 1, except that 50 wt % of silver, as a conductive material, and 10 wt % of lithium carbonate were used, unlike Example 1, and then five cylindrical secondary batteries each having the adhesion unit added thereto were manufactured.

Comparative Example 3

A paste-phase adhesion unit was manufactured in the same manner as in Example 1, except that 60 wt % of silver, as a conductive material, was used and no gas-generating material was used, unlike Example 1, and then five cylindrical secondary batteries, each having the adhesion unit added thereto, were manufactured.

Experimental Example

Measurement of Resistance of Adhesion Unit

Figure 7:
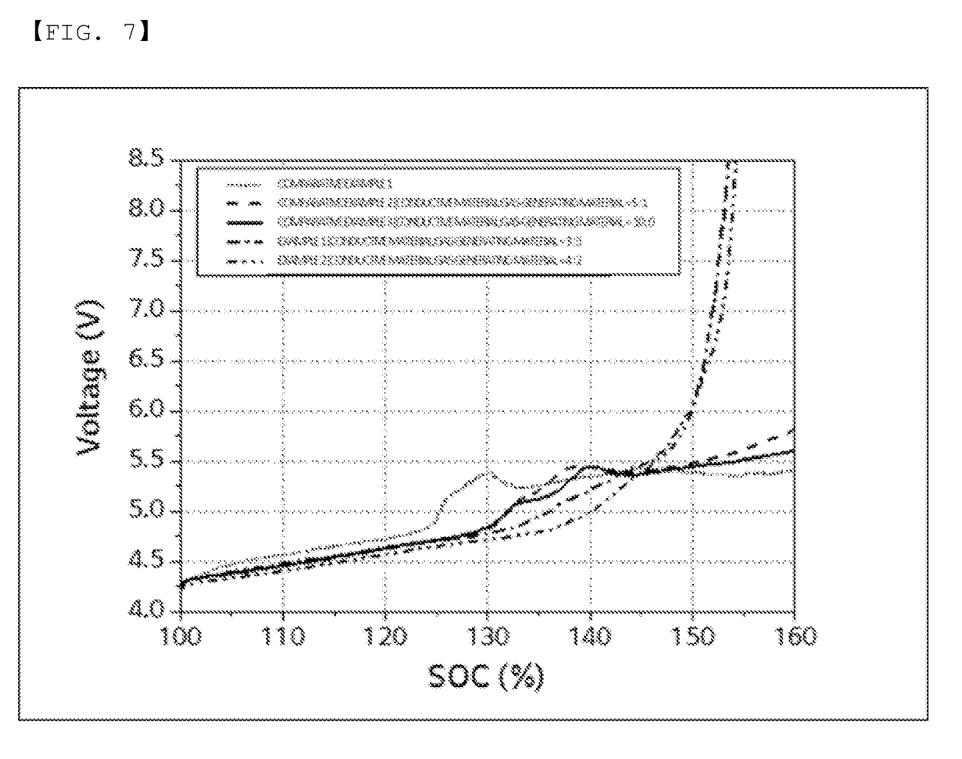
FIG. 7 is a graph showing the results of an experimental example.

Variation in the resistance of a secondary battery depending on temperature was measured using the cylindrical secondary batteries manufactured according to Examples 1 to 2 and Comparative Examples 1 to 3, and the results are shown in FIG. 7.

Resistance measurement was performed by measuring resistance using a 1 kHz AC resistor, and FIG. 7 shows the average of voltages depending on SOC (%) of five samples used under each condition.

Referring to FIG. 7, it can be seen that, in the case of Comparative Example 1, in which welding was used in order to couple the positive electrode tab, Comparative Example 3, in which no gas-generating material was added, and Comparative Example 2, in which 10 wt % of the gas-generating material was added, voltage increased as charging advanced (SOC increased), and the increase of voltage was relatively prominent in some periods; however, the voltage did not reach a charge end voltage (8.4V).

Consequently, it is not possible to obtain an effect in which the voltage reaches the charge end voltage and thus the flow of current is interrupted.

However, in the case of Example 1, in which 30 wt % of the gas-generating material was added, and Example 2, in which 20 wt % of the gas-generating material was added, voltage abruptly increases starting at an SOC of about 140%, and, as a result, the voltage increases to 8.4V or higher.

Consequently, the flow of current is interrupted, whereby it is possible to prevent the explosion of the battery due to overheating thereof.

Those skilled in the art to which the present invention pertains will appreciate that various applications and modifications are possible based on the above description, without departing from the scope of the present invention.

DESCRIPTION OF REFERENCE NUMERALS 100, 200, 300: Cylindrical secondary batteries
101, 201, 301: Top caps
102: PTC element
103, 203, 303: Venting members
104: Current interrupt device
106, 206, 306: Gaskets
110, 210, 310: Cap assemblies
111, 211, 311: Insulation members
120, 220, 320: Jelly-roll type electrode assemblies
121, 221, 321: Positive electrode tabs
130, 230, 330: Battery cases
h1, h2: Thicknesses of cap assemblies
h3, h4: Heights of jelly-roll type electrode assemblies
205, 305, 505: Adhesion units
501, 501': Adhesive materials
502: Conductive material
503, 503': Gas-generating materials

INDUSTRIAL APPLICABILITY

As is apparent from the above description, in a cylindrical secondary battery according to the present invention, electrical connection between an electrode assembly and a cap assembly is achieved using an adhesion unit including an adhesive material, whereby it is possible to prevent foreign matter from being generated in the process of connecting the electrode assembly and an electrode terminal to each other.

In addition, the adhesion unit includes a gas-generating material. When the voltage of the battery increases due to an increase in the temperature of the battery, therefore, the reaction of the gas-generating material progresses, whereby the coupling force of the adhesion unit is reduced. Consequently, it is possible to achieve rapid separation between an electrode tab and the cap assembly.

In addition, resistance abruptly increases as gas is generated in the adhesion unit, whereby voltage increases to a charge end voltage or higher and thus the flow of current may be interrupted.

The invention claimed is:
1. A cylindrical secondary battery comprising:
a jelly-roll type electrode assembly configured to have a structure in which a sheet type positive electrode and a sheet type negative electrode are wound in a state in which a separator is disposed between the positive electrode and the negative electrode, the jelly-roll type electrode assembly including a positive electrode tab;
a cylindrical battery case configured to receive the jelly-roll type electrode assembly, the cylindrical battery case having an open upper end;
a cap assembly mounted to the open upper end of the cylindrical battery case; and
an adhesion unit connecting a lower end surface of the cap assembly to the positive electrode tab of the jelly-roll type electrode assembly, the adhesion unit including an adhesive material, a conductive material, and a gas generating material,
wherein the cap assembly is configured to have a structure which comprises a venting member, the venting member has a notch portion configured to rupture,
wherein the positive electrode tab is coupled to a lower surface of the venting member located under a top cap via the adhesion unit, and wherein the cap assembly is configured to have a structure from which a PTC element is omitted, and the jelly-roll type electrode assembly extends so as to have an additional length corresponding to a thickness of the PTC element, which is omitted.

2. The cylindrical secondary battery according to claim 1, wherein the adhesive material comprises at least one selected from the group consisting of a polyester resin, an epoxy resin, a phenol resin, polyvinyl acetate, polyvinyl butyral, and polyester acrylate.

3. The cylindrical secondary battery according to claim 1, wherein the conductive material comprises at least one selected from the group consisting of graphite, carbon black, conductive fiber, gold, silver, copper, aluminum, an alloy of gold, an alloy of silver, an alloy of copper, and an alloy of aluminum.

4. The cylindrical secondary battery according to claim 1, wherein the gas-generating material is lithium carbonate ($Li_2CO_3$), $CaCO_3$, $K_2CO_3$, $Na_2CO_3$, or $BaCO_3$.

5. The cylindrical secondary battery according to claim 1, wherein a content of the gas-generating material is between 20 wt % to 100 wt % of a content of the conductive material.

6. The cylindrical secondary battery according to claim 1, wherein the cylindrical secondary battery is configured such that a reaction of the gas-generating material commences when a voltage of the cylindrical secondary battery increases, whereby the adhesion unit swells, particles of the conductive material become spaced apart from each other, and a flow of current is interrupted.

7. The cylindrical secondary battery according to claim 6, wherein a temperature at which the reaction of the gas-generating material commences is lower than a melting temperature of the adhesive material.

8. The cylindrical secondary battery according to claim 1, wherein the cylindrical secondary battery is configured such that, when a voltage of the cylindrical secondary battery increases, a coupling force of the adhesion unit is reduced due to melting of the adhesive material, whereby the positive electrode tab is separated from the cap assembly.

9. The cylindrical secondary battery according to claim 1, wherein the cylindrical secondary battery is configured such that, when coupling of the adhesion unit is weakened due to a reaction of the gas-generating material, a shape of the venting member of the cap assembly is inverted, whereby the venting member is separated from the positive electrode tab.

10. The cylindrical secondary battery according to claim 1, wherein the cap assembly is configured to have a structure from which a current interrupt device is omitted.

* * * * *